Figure 1:
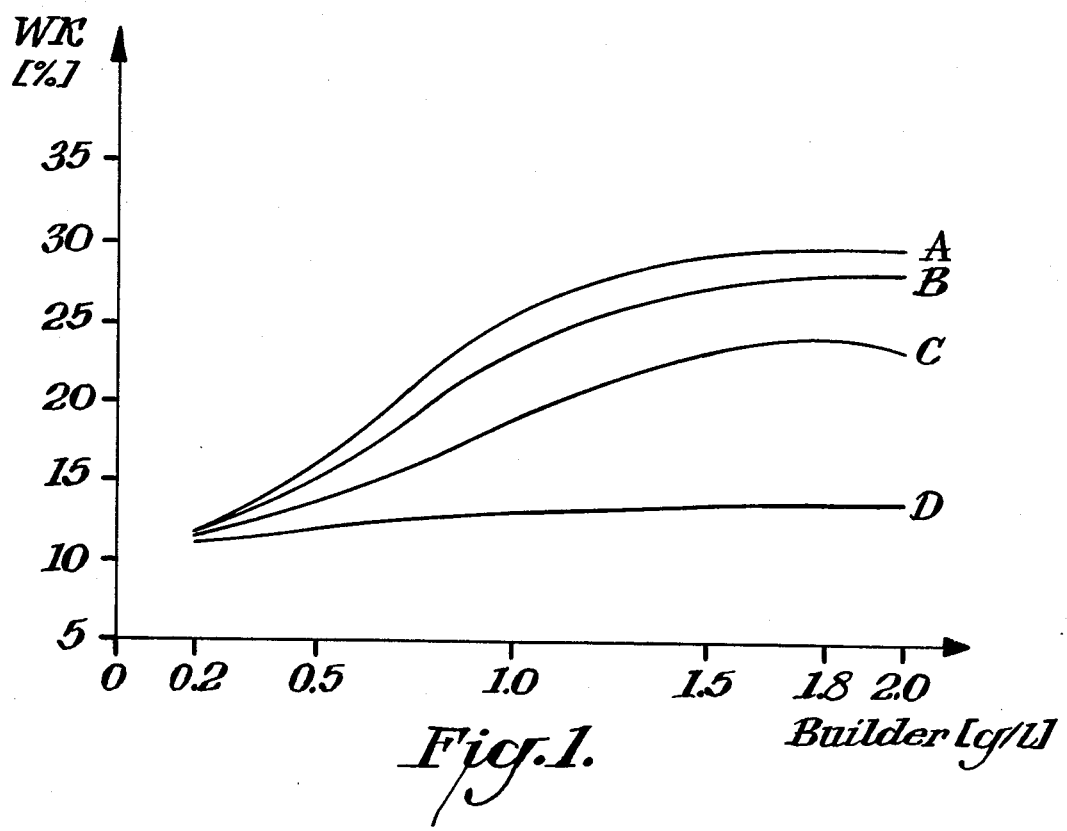

United States Patent [19]

Henning et al.

[11] 3,956,380
[45] May 11, 1976

[54] POLYMERS CONTAINING HYDROXYLIC AND CARBOXYLIC GROUPS

[75] Inventors: Klaus Henning, Hurth; Karl Merkenich, Hurth-Efferen; Joachim Kandler, Erfstadt Lechenich, all of Germany

[73] Assignee: Hoechst Aktiengesellschaft, Frankfurt am Main, Germany

[22] Filed: Mar. 12, 1973

[21] Appl. No.: 340,090

[30] Foreign Application Priority Data

Mar. 16, 1972 Germany............................ 2212623

[52] U.S. Cl............................ 260/535 P; 252/89 R; 252/97; 252/99; 252/121; 252/132; 252/156; 252/DIG. 11; 252/DIG. 12; 252/DIG. 15; 260/484 P
[51] Int. Cl.²......................................... C07C 59/12
[58] Field of Search................................. 260/535 P

[56] References Cited
UNITED STATES PATENTS
3,825,498   7/1974   Altenschopfer et al. ............. 252/99
FOREIGN PATENTS OR APPLICATIONS
720,711   1/1972   South Africa................... 260/535 P

*Primary Examiner*—Paul J. Killos
*Attorney, Agent, or Firm*—Connolly and Hutz

[57] ABSTRACT

The invention provides builders for detergent and cleaning compositions. The builders comprise oligomers and/or polymers containing carboxylic and hydroxylic groups — the latter groups being partially lactonized, if desired — and a predominant proportion of C—C bonds in their principal chain. The oligomers and/or polymers are produced by hydrolyzing halogenated copolymers which have substantially between 5 and 60 weight % of halogen therein and a principal chain based on structural units, in any desirable sequential arrangement, of the following general formulae I and II or I and III

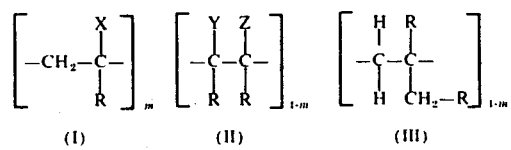

in which X, Y and Z stand for a hydrogen and/or halogen atom with the proviso that at least one of the X, Y and Z substituents stands for a halogen atom, R stands for a carboxy-halide radical, a carboxylic group, ester group, nitrile group or anhydride group, and the mole fraction *m* stands for a number greater than zero and smaller than 1.

5 Claims, 2 Drawing Figures

POLYMERS CONTAINING HYDROXYLIC AND CARBOXYLIC GROUPS

The present invention provides builders for detergents and cleaning agents, the builders comprising oligomers and/or polymers containing carboxylic and hydroxylic groups, and the water-soluble salts thereof.

It has already been reported that the cleaning power of soaps and synthetic detergents in detergent and cleaning agents can be improved by means of certain addends. These cleaning intensifiers are termed builders. Detergent and cleaning agents having such builders therein are more effective, yet less costly than corresponding formulations which are free from builders.

In addition to a tenside constituent, which merely enables hydrophobic dirt, such as carbon black and fat particles, to be dispersed and/or peptized, it is necessary for a detergent to contain a further ingredient removing hydrophilic dirt, namely a builder. In the absence of a builder, incrusted dirt on the fabric is but incompletely taken up by the cleaning bath and dirt particles are found to deposit on the fabrics. As a result, it is impossible to produce satisfactory cleaning effects.

The mechanism and the details of the "builder effect" have not yet been fully described. Vital to the function of the builders is a plurality of processes comprising, for example: the stabilization of pigment dirt suspensions; the emulsification of dirt particles; the effect on the surface and interfacial properties of aqueous tenside solutions; the solubilization of water-insoluble ingredients of the cleaning bath; the peptization of agglomerated dirt; the neutralization of acid substances; and the inactivation of mineral matter in the cleaning bath.

To determine the quality and qualification of individual materials for use as a builder, it is good practice to test their power for sequestering Ca-ions, their power for forming stable dispersions as well as their behaviour and efficiency in washing or cleaning operations, to ensure the qualitative and quantitative determination of all factors that make their contribution to the builder effect.

Customary builders comprise water-soluble alkali metal salts of mineral acids, such as alkali metal carbonates, borates, phosphates, polyphosphates, bicarbonates, and silicates.

While a plurality of materials have been suggested for use as builders, the fact remains that linear condensed alkali metal phosphates or polyphosphates, more particularly sodium tripolyphosphate, are almost exclusively used as the builders in customary detergent and cleaning agents having up to substantially 50 weight percent of builders therein.

The considerably increased consumption of phosphate-containing detergent and cleaning agents both for domestic and industrial purposes has also effected an increase in the phosphate content of natural waters. In studies of the eutrophication of waters, which has been found to occur at increasing rates, the water-soluble nitrate and phosphate salts have recently been held to have properties that are able under certain conditions to promote the growth of certain alga species, and thereby to make their contribution to the eutrophication of water. Even though it is impossible for the time being definitely to clarify this problem, namely the contribution of phosphate-containing detergents and cleaning agents to the eutrophication of water, it is highly desirable to have potential substitutes free from nitrogen and phosphorus for the builders that find widespread use in current detergent formulations.

Compounds which are free from nitrogen and phosphorus have already been suggested for use as builders in detergents. Such derivatives, such as dicarboxyl and carboxymethyl starch, polycarboxylic acids, such as polymaleic acid and polyitaconic acid as well as their copolymers with unsaturated carboxylic acids, olefins or short-chain unsaturated aliphatic ethers or alcohols, have been used heretofore. Further customary builders comprise oxydiacetic acid, oxydisuccinic acid, cyclocarboxylic acids, such as benzene penta- or tetracarboxylic acid, esters of polyethyleneglycol and adipic acid or maleic acid containing sulfonate groups, as well as esters of ethylene glycol and tri- or tetracarboxylic acids. In German published specification DOS No. 1-904 940, it is finally suggested that polyoxycarboxylic acids or their alkali metal salts should be used as detergent ingredients.

The above builder substances are however not fully satisfactory; they have more particularly been found to merely posses unsatisfactory builder properties, such as those reported above, and accordingly to produce unsatisfactory cleaning effects. Still further, the art is partially in need of processes which would permit these customary builders to be made under commercially attractive conditions. The present invention now provides builders which are free from the disadvantageous effects referred to hereinabove.

The present invention provides more particularly builders for detergents and cleaning compositions, comprising oligomers and/or polymers containing carboxylic and hydroxylic groups — the latter groups being partially lactonized, if desired — and a predominant proportion of C—C— bonds in their principal chain, the said oligomers and/or polymers being produced by the steps comprising hydrolyzing one or more halogenated copolymers which have substantially between 5 and 60 weight % of halogen therein and a principal chain based on structural units, in any desirable sequential arrangement, of the following general formulae I or II or I and III

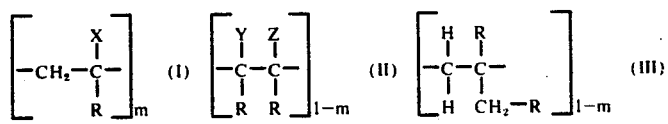

in which X, Y and Z stand for a hydrogen and/or halogen atom with the proviso that at least one of the X, Y and Z substituents stands for a halogen atom, R stands for a carboxyhalide radical, a carboxylic group, ester group, nitrile group or anhydride group, and the mole fraction $m$ stands for a number greater than zero and smaller than 1; and effecting the hydrolysis of the halogenated copolymer(s), which have a relative viscosity substantially between 0.1 and 5, determined on a 4 weight % aqueous solution at 25°C, at elevated temperature with at least stoichiometric proportions of water so as to effect transformation of the halogen atoms into hydroxylic groups and transformation of carboxyhalide radicals, ester groups, nitrile groups or anhydride groups, if any, into carboxylic groups.

In accordance with a preferred feature of the present invention, the builders should contain substantially between 51 and 77 weight %, preferably between 54 and 73 weight %, of free or lactonized carboxylic groups, substantially between 1 and 29.5 weight %, preferably between 2.6 and 20.4 weight %, of free or lactonized hydroxylic groups, and have a specific viscosity substantially between 0.1 and 2.0, determined on a 1 weight % solution in dimethyl formamide at 25°C.

The water-soluble salts, e.g. the alkali metal salts of the above oligomers and/or polymers containing carboxylic and hydroxylic groups should preferably be used as ingredients of detergents and cleaning agents, in a proportion substantially between 10 and 80 weight %, preferably between 15 and 60 weight %, based on the detergent.

The invention also provides detergents and cleaning compositions, which are based on anion-active, cationic, amphoteric, ampholytic and/or non-ionic tensides in admixture with further addends, if desired, the detergents and cleaning compositions being characterized in that they contain a certain proportion of the oligomer and/or polymer builders of the present invention, containing carboxylic and hydroxylic groups. The oligomers and/or polymers are made by a process comprising hydrolyzing one or more halogenated copolymers, which have substantially between 5 and 60 weight % of halogen therein and a principal chain based on structural units, in any desirable sequential arrangement, of the following general formulae I and II or I and III

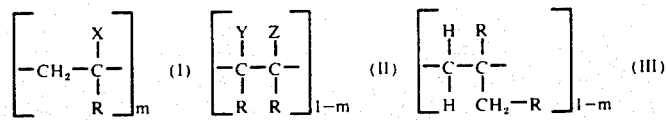

in which X, Y and Z stand for a hydrogen and/or halogen atom with the proviso that at least one of the X, Y and Z substituents stands for a halogen atom, R stands for a carboxyhalide radical, a carboxylic group, ester group, nitrile group or anhydride group, and the mole fraction $m$ stands for a number greater than zero and smaller than 1, and which have a relative viscosity substantially between 0.1 and 5, determined on a 4 weight % aqueous solution, the hydrolysis being effected at elevated temperature with at least stoichiometric proportions of water so as to effect transformation of the halogen atoms into hydroxylic groups and transformation of carboxyhalide radicals, ester groups, nitrile groups or anhydride groups, if any, into carboxylic groups.

The oligomers and/or polymers containing carboxylic and hydroxylic groups, which are ingredients of the detergent and cleaning compositions of the present invention should conveniently contain substantially between 51 and 77 weight %, preferably between 54 and 73 weight %, of free or lactonized carboxylic groups, substantially between 1 and 29.5 weight %, preferably between 2.6 and 20.4 weight %, of free or lactonized hydroxylic groups and should have a specific viscosity substantially between 0.1 and 2.0, determined on a 1 weight % solution in dimethyl formamide at 25°C.

The water-soluble salts, e.g. the alkali metal salts of the oligomers and/or polymers containing carboxylic and hydroxylic groups should preferably be used as the builders in the detergent and cleaning compositions of the present invention, in a proportion substantially between 10 and 80 weight %, preferably between 15 and 60 weight %, based on the detergent. The aqueous washing liquor made with the use of the above detergent and cleaning compositions generally has a pH-value between 8 and 12.

In addition to the builders of the present invention, the detergent and cleaning compositions may contain one or more customary builders, e.g. alkali metal polyphosphates. The tenside components of the detergent preferably include anionic or non-ionic substances.

The anionic tensides include more particularly the water-soluble salts of higher fatty acids or resinic acids, such as sodium or potassium soaps of hardened or non-hardened coco palm-kernel oil or beet oil, or of tallow and the mixtures thereof. The anion-active substances used in accordance with this invention include higher alkyl-substituted, mononuclear and aromatic sulfonates, e.g. alkylbenzenesulfonates containing between 9 and 14 carbon atoms in the alkyl radical, alkyltoluenesulfonates, alkylxylenesulfonates, alkylphenolsulfonates or alkylnaphthalenesulfonates and sulfatized aliphatic alcohols or alcohol ethers, such as sodium or potassium lauryl or hexadecylsulfate, triethanolaminelaurylsulfate, sodium or potassiumoleylsulfate, and sodium or potassium salts of laurylsulfate ethoxylated with substantially between 2 and 6 mols of ethylene oxide, and similar materials.

The non-ionic tensides in detergent and cleaning compositions normally are compounds which present an organic hydrophobic group and a hydrophilic radical. Exemplary representatives of these non-ionic tensides are the condensation products of alkylphenols with ethylene oxide or of higher fatty alcohols with ethylene oxide, the condensation products of polypropyleneglycol with ethylene oxide or propylene oxide, and the condensation products of ethylene oxide with the reaction product of ethylenediamine and propylene oxide. The above compounds also include long-chain tertiary amine oxides.

The tenside ingredients of the detergent and cleaning compositions of the present invention finally include ampholytic and amphoteric materials, for example derivatives of aliphatic, secondary or tertiary amines or quaternary ammonium compounds having from 8 to 18 carbon atoms and a hydrophilic group in the aliphatic radical, e.g. sodium-3-dodecylaminopropionate; sodium-3-dodecylaminopropane-sulfonate; 3-(N,N-dimethyl-N-hexadecylamino)-propane-1-sulfonate or fatty acid amidoalkyl-N,N-dimethylacetobetain, the fatty acid containing between 8 and 18 carbon atoms and the alkyl radical containing 3 carbon atoms.

Further addends, which may be used in the detergent and cleaning compositions of the present invention, include, for example: the alkali metal or ammonium salts of sulfuric acid, silicic acid, carbonic acid, boric acid, alkylene-, hydroxyalkylene- or aminoalkylphosphonic acid. The addends also include bleaching agents, stabilizers for peroxide compounds, and water-soluble organic complex formers.

These latter groups of compounds comprise more particularly sodium perborate monohydrate or tetrahydrate, alkali metal salts of peroxymono- or disulfuric acid, peroxohydrates or ortho-, pyro- and polyphosphates, water-insoluble precipitated magnesium silicate, and alkali metal salts of iminodiacetic acid, nitrilotriacetic acid and ethylenediaminetetracetic acid.

Still further ingredients of the detergent and cleaning compositions include substances improving the capacity of washing liquors for suspending or peptizing dirt, such as carboxymethylcellulose, polyvinyl alcohol, polyvinylpyrolidone, or foam regulators, such as mono- and dialkylphosphonic acid esters containing between 16 and 20 carbon atoms in the alkyl radical, as well as optical brighteners, disinfectants and/or proteolytic enzymes.

The builders of the present invention or the detergent and cleaning compositions made therewith offer technically beneficial properties as they considerably delay or prevent the precipitation of calcium ions in the washing bath and still further produce stable dispersions both with hydrophilic and hydrophobic dirt particles. A further advantage resides in the fact that the builders of the present invention are free from phosphorus and nitrogen and accordingly fail to contribute to the eutrophication of natural waters.

The builders of the present invention can be produced by the process described in German (patent application No. P 21 64 888.4) which yields the builders defined hereinabove.

One way of producing a halogenated copolymer based on structural units of the general formulae I and II or I and III comprises copolymerizing monomeric compounds of the general formulae IV and V or IV and VI

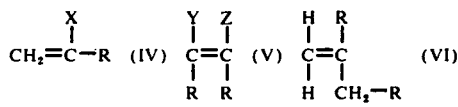

in which X, Y and Z stand for a hydrogen atom and/or halogen atom with the proviso that at least one of the substituents X, Y and Z stands for a halogen atom, and R stands for a carboxyhalide radical, a carboxylic group, ester group, nitrile group or anhydride group, the polymerization being effected in solution, suspension or emulsion and in contact with a polymerization catalyst, at temperatures substantially between 50° and 150°C, the mole fraction $m$ of the compound of general formula IV in the monomer mixture standing for a number which is greater than 0 and smaller than 1.

The properties of the builders of the present invention were evaluated in the following Examples by identifying their dispersing power, their power for binding lime and their delaying influence upon the precipitation of calcium ions in aqueous solution. The results obtained were compared with those produced by customary builders. In addition to this, wash tests were made to determine the cleaning power of washing liquors which contained the builders of the present invention in admixture with further detergent components. Use was made in the wash tests of builders A, B, C and D, of which builders A and B were builders in accordance with this invention, and of which builders C and D were known builders. The production of builders A, B, C and D is described in Examples 1 to 4.

EXAMPLE 1

Preparation of Builder A a. A round flask fitted with a stirrer and reflux condenser was fed with 160.5 grams of α-chloroacrylic acid, 147 grams of maleic anhydride and 700 milliliters of benzene, and the whole was dissolved therein. The solution was heated to reflux temperature and 1 gram of benzoyl peroxide was added thereto with agitation. A fine particulate copolymer gradually commenced precipitation, which was filtered off with suction at the end of 1.5 hours, washed with 100 milliliters of benzene and dried under vacuum. The fine particulate polymer was obtained in a yield of 225 grams. It had an acid equivalent weight of 73.6. This corresponded to a value of 0.6 for the mole fraction $m$.

b. 215 grams of the above polymer were hydrolyzed. To this end, they were dissolved in 700 milliliters of H$_2$O and the solution was heated to boiling with agitation. The polymer commenced reprecipitation in the form of a coagulate, which was removed by suction filtration and dried at 100°C. The hydrolyzed product was obtained in a yield of 141 grams. It contained 62.1 weight % of free or lactonized COOH-groups. The benzenic, polymer-containing filtrates obtained in the manner described under (a) above were mixed with 0.6 gram of benzoyl peroxide and heated under reflux for a further 1.5 hours. This resulted in the formation of a second polymer fraction, which was removed by suction filtration, washed with benzene and dried. The yield was 57 grams.

c. 60 grams of the hydrolyzate obtained in the manner described under (b) above were dissolved in a 15 % aqueous solution which contained 35 grams of sodium carbonate. A pH-value of 7 was found to establish in the solution. On subjecting the viscous solution so obtained to evaporation, 94 grams of the sodium salt of the polymer commenced precipitation in the form of a white amorphous compound.

EXAMPLE 2

Preparation of Builder B a. A round flask fitted with a stirrer and reflux condenser was charged with 66 grams of chloromaleic anhydride and 200 milliliters of benzene and the resulting solution was heated to boiling. Following this, 0.3 gram of benzoyl peroxide was added and the whole was mixed dropwise with a solution of 54 grams of α-chloroacrylic acid in 150 milliliters of benzene. After 2 hours, a further 0.3 gram of benzoyl peroxide was added and the suspension was heated for a further 2 hours under reflux. The resulting and precipitated polymer was removed by suction filtration, washed with 300 milliliters of benzene and dried.

The yield was 102 grams and the acid equivalent was 81.5. This corresponded to a value of 0.55 for $m$.

The specific viscosity of a 4 % aqueous solution at 25°C was 0.35.

28.8 % of Cl were found to be present in the copolymer.

b. The polymer obtained in the manner described uner (a) above was hydrolyzed. To this end, it was dissolved in 1.5 liters of water and boiled for 1 hour. A porous mass was found to precipitate, which was washed until free from chloride and dried. The yield was 83 grams. The hydrolyzate contained 62.1 weight % of free or lactonized COOH-groups.

c. The sodium salt of the hydrolyzate was produced in a manner analogous to that described in Example 1.

EXAMPLE 3

Preparation of Builder C

A solution of 196 grams of maleic anhydride and 1 gram of benzoyl peroxide in 700 milliliters of benzene was mixed dropwise, simultaneously and at equal rates, within 4 hours with 144 grams of acrylic acid and with a solution of 1.5 grams of benzoyl peroxide in 100 milliliters of benzene. Following this, the mixture was maintained at reflux temperature for a further 2 hours, cooled and the precipitated copolymer was suction filtered. The copolymer was washed with 500 milliliters of benzene and the resulting white powder was dried at 60°C under vacuum. The yield was 286 grams. The product contained 67.2 % of COOH-groups.

EXAMPLE 4

Preparation of Builder D

A mixture of 200 milliliters of freshly distilled acrolein and 216 milliliters of freshyl distilled acrylic acid was added, within 75 minutes and with agitation, to a mixture of 110 milliliters of distilled water and 270 milliliters of hydrogen peroxide of 30 weight % strength. This latter mixture had a temperature of 50°C. Following this, the temperature was gradually increased to 100°C. By the addition of 1000 milliliters of distilled water and by cooling from the outside, the reaction solution was brought to a temperature of 30°C. Following this, the reaction solution was allowed to stand for several hours, then diluted with a further 500 milliliters of distilled water and 30 milliliters of hydrochloric acid of 20 weight % strength were added to cause precipitation. After 1 hour, the precipitate was filtered off from polyaldehydocarboxylic acid, washed free from acid with the use of distilled water, and dried at 60°C under vacuum. A suspension was prepared from 127 grams of the dry precipitate in 380 milliliters of water and 610 milliliters of a formalin solution of 40 weight % strength and 127 milliliters of sodium hydroxide solution of 40 weight % strength were added thereto, within 30 minutes. The resulting solution was filtered. After several hours, solid polyoxycarboxylic acid was added thereto so as to establish a pH-value between 5 and 6. The solution was filtered once again, evaporated to dryness and the resulting sodium salt of polyoxycarboxylic acid was dried at 110°C under vacuum. The free polyoxycarboxylic acid contained 49.5 % of COOH. This product was prepared in a manner analogous to that disclosed in working Example 18 of German published Specification No. 1 904 940.

EXAMPLE 5

Determination of the Dispersing Power and the Power for Binding Lime of Builders A, B, C and D.

a. The dispersing power of the individual builders was tested in aqueous, 4 weight % suspensions of dry pulverized iron (III) oxide with a particle size of less than 0.058 mm, or suspensions of powdered graphite. The suspensions were made in 25 cc measuring cylinders. The individual builders were used in the suspensions in a concentration of 16 weight %, based on the aqueous solution. The settling time of the iron (III) oxide or graphite particles and the volume of sedimentation after 24 hours at a pH value of 10 of the aqueous phase were determined in each particular case as an index of the dispersing power. The results obtained are indicated in the following Table, in which the individual columns have the following meanings:

Table 1:

| I | II a | II b | III a | III b |
|---|------|------|-------|-------|
| A | 56 | 1.4 | 52 | 2.2 |
| B | 62 | 1.3 | 58 | 2.4 |
| C | 53 | 1.5 | 49 | 3.7 |
| D | 42 | 1.8 | 26 | 3.9 |

I: Builder.
II a: Settling time of iron (III) oxide particles, in hours.
II b: Volume of sedimentation of dispersed iron (III) oxide, in milliliters.
III a: Settling time of graphite particles, in hours.
III b: Volume of sedimentation of graphite particles, in milliliters.

As can be seen from Table 1, the iron (III) oxide or graphite dispersions produced with builders A and B (invention) were found to be more stable than those produced with builders C and D (prior art builders). Builders A and B were more particularly found to prolong the settling time of the sedimented particles and reduce the volume of sedimentation.

b. The individual builders were tested as to their power for binding lime. To this end, an aqueous, sodium carbonate-containing solution, which had 1 weight % of builder therein and which had a pH-value of 10, was titrated with an aqueous 0.1N calcium chloride solution until turbidity began to occur and remain. The power for binding lime is expressed by a numerical value indicating the grams of calcium ions kept in solution by 100 grams of test substance, under the above conditions. The results obtained are indicated in the following Table 2:

Table 2:

| Builder | Power for binding lime (Grams of $Ca^{++}$ per 100 grams of builder) |
|---------|---------------------------------------------------------------------|
| A | 14.9 |
| B | 17.0 |
| C | 6.7 |
| D | 3.4 |

As can be seen from Table 2, builders A and B (invention) compare favorably with the prior art builders C and D as regards their power for binding lime. Builders A and B were more particularly found to enable substantially more $Ca^{++}$-ions to be kept in solution than builders C and D.

EXAMPLE 6

Wash tests were made to determine the cleaning power of wash liquors which for a constant concentration of known detergent components contained varying proportions of the A and B builders of the present invention and the test results obtained were graphically plotted in FIG. 1 of the accompanying graphs. Analogous wash tests with the use of the conventional C and D builders were made for the purpose of comparison, and the cleaning power was also graphically plotted in FIG. 1, in the form of curves.

The wash tests were made on standard cotton fabrics soiled with "Krefeld" dirt in a "Launer-O-meter" at a wash bath temperature of 95°C. Standard fabrics soiled with Krefeld dirt have been defined by Kurt Lindner in the book entitled; "Tenside, Textilhilfsmittel - Waschrohstoffe", Wissenschaftl. Verlagsgesellschaft Stuttgart (1964), volume II, page 1837.

The wash water had a hardness of 20° (German degrees of hardness) and a pH of 10. The wash period was 30 minutes and the bath ratio, expressed by the ratio of material to be washed in kg to wash liquor in liter was 1:50, and the wash operation was carried out in the presence of 10 steel balls.

After the prescribed wash time, the standard cotton fabric was rinsed, once hot and once cold, with water of identical hardness, and its degree of whiteness was then determined using an Elrepho remission photometer, (a product of Zeiss) and a filter R 53. Based on the test result obtained, the cleaning power was calculated according to the following formula:

$$\% \, WK = \% \, WG_a - \% \, WG_b$$

in which
 $\% \, WK = \%$ cleaning power,
 $\% \, WG_a = \%$ whiteness of washed fabric,
 $\% \, WG_b = \%$ whiteness of unwashed fabric.

The above wash tests were made with the use of a wash liquor which contained, per 1000 milliliters of water:
 0.45 gram/liter of dodecylbenzenesulfonate,
 0.15 gram of ethoxylated tallow fatty alcohol with 11 mols of ethylene oxide per mol of alcohol,
 0.15 gram/liter of hardened tallow soap and
 0.2 – 2 gram/liter of builder A or B or C or D.

Curves A, B, C and D in the accompanying graphs demonstrate the cleaning power inherent to the individual wash liquors. Curves A and B represent the results obtained in wash tests made with the use of the A and B builders of the present invention, whereas curves C and D represent the results obtained in wash tests made with the use of known C and D builders. A wash liquor containing 1.8 gram/liter of builders A and B, respectively, was found to have a cleaning power of 30 and 28.5 %, respectively. The same liquor, save that it contained builders C and D, respectively, had a cleaning power of merely 24.3 and 13.8 %, respectively. As can be seen, the builders of the present invention were found also to favorably compare with the known builders, in the standard wash test.

EXAMPLE 7

The procedure was the same as that described in Example 6, save that the wash liquor contained, per 1000 milliliters of water:
 0.45 gram/liter of dodecylbenzenesulfonate,
 0.15 gram/liter of ethoxylated tallow fatty alcohol with 11 mols of ethylene oxide per mol of alcohol,
 0.15 gram/liter of hardened tallow soap,
 0.15 gram/liter of magnesium silicate,
 0.15 gram/liter of sodium silicate,
 1.25 grams/liter of sodium perborate tetrahydrate,
 0.45 gram/liter of sodium sulfate,
 0.05 gram/liter of tylose, and
 0.2 – 2 grams/liter of builder A or B or C or D.

Figure 2:
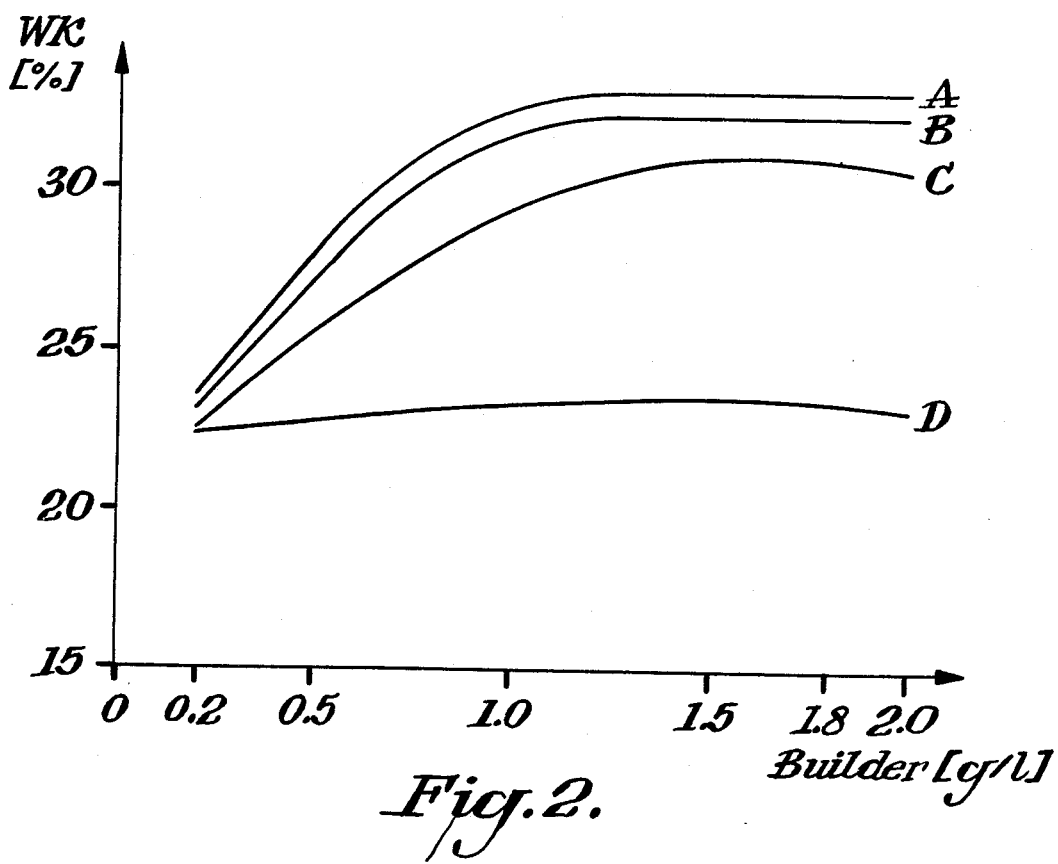

The wash results obtained are indicated by curves A, B, C and D in FIG. 2 of the accompanying graphs, the curve designations being identical with the designations selected for the builders. Upon evaluating the curves the same result as that indicated for FIG. 1 is obtained.

What is claimed is:

1. Builders for detergent and cleaning agents prepared by copolymerizing chloromaleic acid anhydride with alpha-chloracrylic acid followed by hydrolysis with water, the resulting hydrolyzates containing substantially between 54 and 73 weight % of free or lactonized carboxylic groups, and having a specific viscosity substantially between 0.1 and 0.2, determined on a 1 weight % solution in dimethyl formamide at 25°C, neutralizing the said hydrolyzates with aqueous sodium carbonate and subjecting the viscous solution so obtained to evaporation of the water for obtaining a dry product of the sodium salts of the hydrolyzates.

2. The builders as claimed in claim 1, wherein the hydrolyzates contain 62.1 weight % of free or lactonized carboxylic groups.

3. The builders as claimed in claim 1, wherein the said oligomers or polymers contain substantially between 51 and 77 weight % of free or lactonized carboxylic groups, substantially between 1 and 29.5 weight % of free or lactonized hydroxylic groups, and have a specific viscosity substantially between 0.1 and 2.0, determined on a 1 weight % solution in dimethyl formamide at 25°C.

4. The builders as claimed in claim 3, wherein the oligomers or polymers have between 54 and 73 weight % of free or lactonized carboxylic groups therein.

5. The builders as claimed in claim 3, wherein the oligomers or polymers have between 2.6 and 20.4 weight % of free or lactonized hydroxylic groups therein.

* * * * *